L. E. WATERMAN.
PLOW LIFT.
APPLICATION FILED JULY 7, 1913.

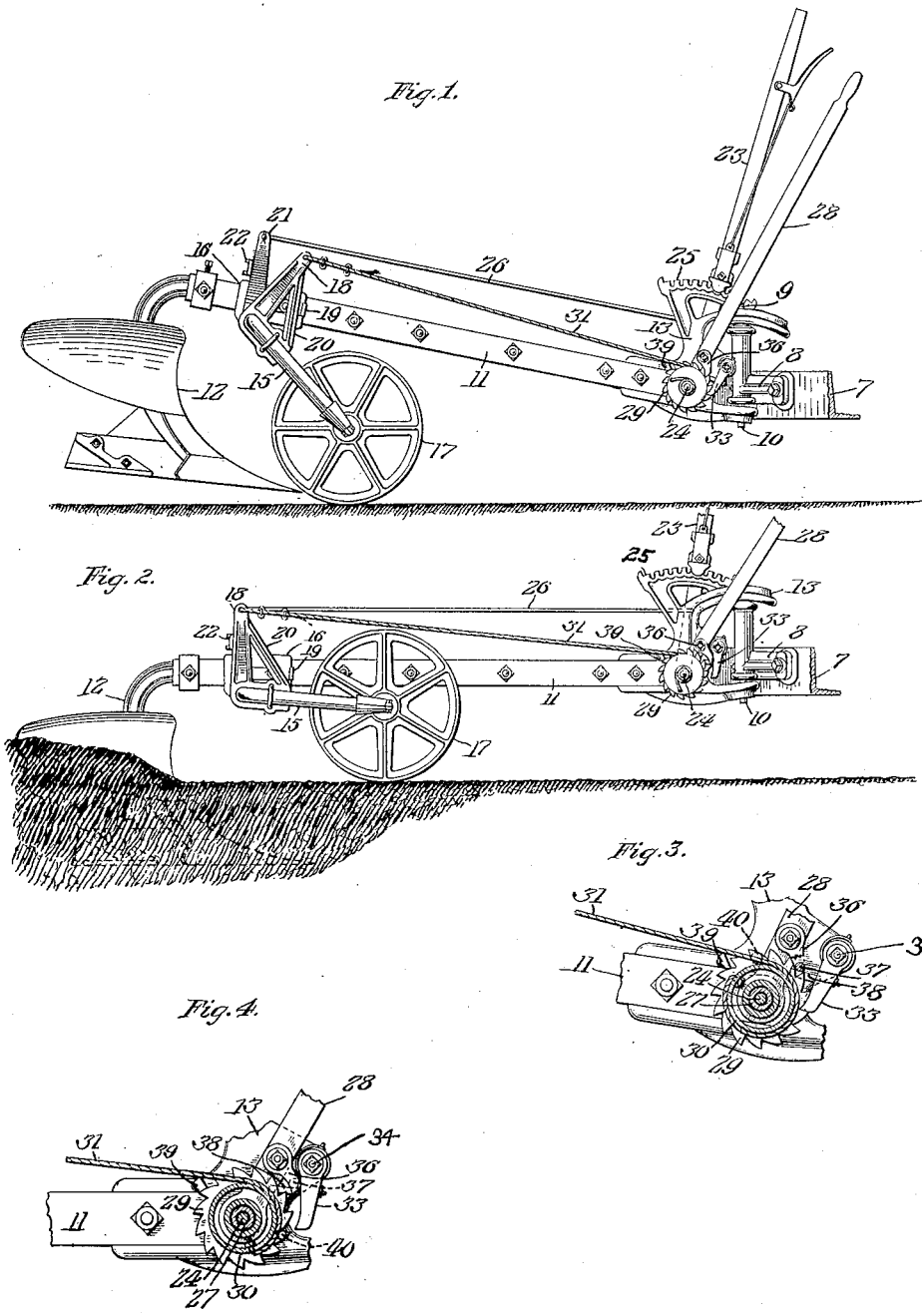

1,104,750.

Patented July 21, 1914.
2 SHEETS—SHEET 2.

Witnesses:
W. L. Dorr
John H. McCanna Jr.

Inventor:
Lewis E. Waterman
By A. O. Behel
Atty.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

PLOW-LIFT.

1,104,750.

Specification of Letters Patent.

Patented July 21, 1914.

Application filed July 7, 1913. Serial No. 777,678.

*To all whom it may concern:*

Be it known that I, LEWIS E. WATERMAN, a citizen of the United States, residing at Rockford, in the county of Winnebago and State of Illinois, have invented certain new and useful Improvements in Plow-Lifts, of which the following is a specification.

This invention relates to plow lifts and more particularly to those adapted to be manually operated.

It is the object of this invention to provide a vertically movable plow beam with means in coöperation with a ratchet drive to raise and lower the plow beam to its inoperative and operative positions.

It is the further object to construct said raising and lowering means to be manually operated, to provide means for adjusting the limits of the various positions attained by the plow beam, and to provide a novel means for holding the beam in its raised position and for releasing it from said raised position.

Figure 5:
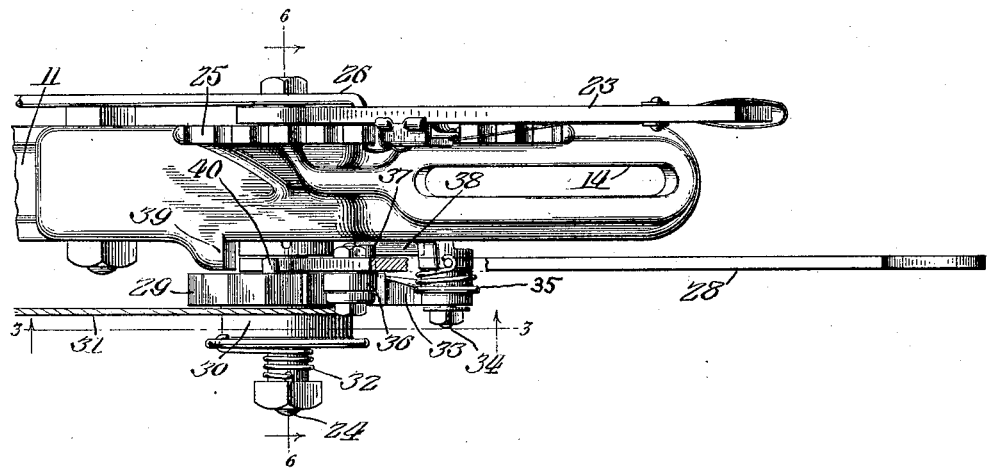
Figure 6:
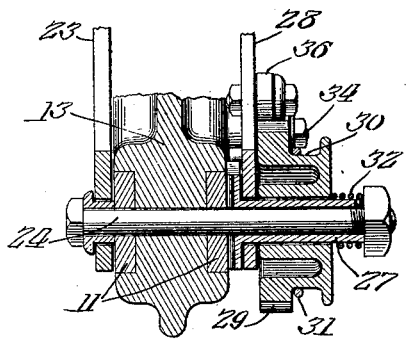

In the accompanying drawings: Figure 1, is a side elevation of my improved plow raising and lowering means applied to a plow beam, and illustrating the beam in its raised position. Fig. 2, is a similar view with the plow beam in its lowered working position. Fig. 3, is a detail sectional view on the line 3—3 of Fig. 5, showing the positions of the ratchet engaging means during the operation of raising the plow beam. Fig. 4, is a similar view but with the ratchet engaging means released to allow the plow beam to fall. Fig. 5, is a plan view of the forward lever operating end of the plow beam. Fig. 6, is a vertical section on the line 6—6 of Fig. 5.

Fixedly carried by a frame 7 which is adapted to be suitably drawn, is a bracket 8 having vertically disposed upper and lower pins 9 and 10 respectively. A plow beam 11 carrying a plow 12 at its rear end has bolted to its front end a yoked bracket 13, the lower arm of the yoke being pivotally mounted on pin 10 and the upper arm having an elongated slot 14 in which the pin 9 is located, this connection between the frame and plow beam allowing the plow beam a vertically pivotal movement from the fixed bracket 8.

A wheel-support 15 pivotally carried by the bracket 16 which is mounted at the free end of the plow beam, carries a rotatable supporting-wheel 17. An arm 18 is fixedly carried by the wheel-support 15, at right angles thereto, making with the wheel-support, a bell-crank lever pivoted in the bracket 16. An adjustable stop 19 against which the brace 20 of the arm 18 is adapted to contact, forms a limit for the height to which the plow beam may be raised. A lever 21 pivoted concentric with wheel-support 15 carries a fixed stop 22 against which the arm 18 is adapted to contact to limit the lowered working position of the plow beam, and said lever 21 is adjustable to vary the limit of said lowered position by the hand lever 23 pivoted to the bolt 24 which is carried by the plow beam and bracket 13, the hand lever having a thumb-catch connection with a toothed segment 25 formed with said bracket, and having a rod connection 26 with the free end of said adjustable arm 21.

One end of bolt 24 is supported by the sleeve extension 27 (Fig. 6) carried by the plow beam, and mounted loose upon said sleeve adjacent the beam is the hand lever 28, and mounted rotatably on sleeve 27 at the inner end of said lever is the ratchet-wheel 29 formed with a drum 30 at its outer side. A cable 31 has one end fixed with said drum and its other end connected to the free end of arm 18, there being a coiled spring 32 mounted upon the sleeve 27 to exert a tension upon the drum to keep the cable wound upon the drum. A catch-dog 33 is pivotally mounted upon bolt 34 carried by the bracket 13 and is held yieldingly into engagement with the teeth of said ratchet-wheel by a coiled spring 35. A feed dog 36 is pivotally carried by the lever 28 so that it will be maintained through gravity, in engagement with the ratchet-wheel. The feed-dog 36 has a lug extension 37 at one side of its head which is adapted to contact a cam face 38 extending from one side of bracket 13 to limit the downward pivotal movement of said dog and to guide the dog into contact with the catch-dog 33 as will be hereinafter described. A stop 39 formed with bracket 13 limits the backward movement of the lever 28, and a projecting pin 40 carried at the inner side of the ratchet-wheel serves as a stop against which the lever 28 is adapted to contact when raising the plow beam, this stop 40 preventing the ratchet-wheel from being rotated to raise the plow beam beyond a predetermined point.

The operation of raising and lowering the plow is as follows: Assuming the plow to be in its working position in the ground, as seen in Fig. 2, the lever 28 will be oscillated backward and forward but not to such a degree as to actuate the dog 33, thus rotating the ratchet wheel by the feed-dog 36, and winding the cable 31 upon the drum 30, the cable by pulling upon arm 18 rocking the wheel-support upon its pivot and raising the plow beam. When the stop 40 (as seen in Fig. 3) reaches the lever 28, movement of this lever is stopped as to raising the plow any higher, thus the height of raising limited. But should this stop become defective the stop 19 would limit this movement; said stop 19 being adapted also, when the plow is raised and is being drawn over the ground, to limit further pivotal movement of the beam support. With the plow beam thus in its raised position, to lower it, the lever 28 will be moved forward as shown in Fig. 2, the lug 37 of dog 36 being carried upon cam face 38 to release said dog from the ratchet wheel and to guide the dog into contact with the catch-dog 33 and release same from the ratchet wheel, whereupon the plow will drop to its lowered position by its own weight. Through the adjustment of lever 23 to each arm 21, the depth to which the plow shall cut may be regulated.

I claim as my invention.

1. In a plow structure, the combination with a draft frame and a plow beam pivotally connected thereto, of lifting means coöperating with the plow beam, a drum, a cable connection between the drum and lifting means, a lever for rotating the drum, a catch adapted to engage the drum, means movable with the drum for limiting capability of operation of the lever upon the drum, and means operable through movement of said lever for actuating the catch.

2. In a plow structure, the combination with a draft frame and a plow beam pivotally connected thereto, of lifting means for the plow beam, and operating means having connection with the lifting means including a reciprocable lever in operable connection with said operating means, a catch adapted to lock the movement of said lifting means in one direction, means movable through movement of the drum for limiting capability of operation of the lever on the drum, and means operable through movement of said lever to release said catch from said locked position.

3. In a plow structure, the combination with a vertically movable plow beam, of a bell-crank member pivoted thereto, a land-wheel journaled on one arm of the bell-crank member, a pivoted lever having a stop contactable with the other arm of said bell-crank member, and a segment-engagable lever having a connection with said pivoted lever and adapted to maintain same in various set positions.

4. The combination with a plow beam and lifting device, of a drum having connection with said device, a lever having a ratchet connection with said drum and being reciprocable to rotate same, and a stop carried by the drum and against which said lever is adapted to contact at a predetermined point in the rotation of drum.

5. The combination with a plow beam and lifting device, of a drum having connection with said device, a ratchet wheel in connection with the drum, a lever, a dog operated by the lever to engage the ratchet wheel to rotate same, a catch held in engagement with a portion of the drum, and said dog being in such operable relation with said catch that the dog, through movement of the lever, may move the catch from its said engagement with the said portion of the drum, and means for limiting the capability of operation of the lever on the drum.

6. The combination with a plow beam and lifting device, of a drum having a connection with said device, a ratchet wheel in connection with the drum, a lever, a dog operated by the lever to engage the ratchet wheel and rotate same, a catch-dog held yieldingly into engagement with the ratchet wheel, means for guiding the dog into contact with said catch-dog to release said catch-dog from the ratchet wheel, and means for limiting the capability of operation of the lever on the drum.

In testimony whereof I have hereunto set my hand in presence of two subscribing witnesses.

LEWIS E. WATERMAN.

Witnesses:
JOHN F. McCANNA, Jr.,
E. D. E. N. BEHEL.

Copies of this patent may be obtained for five cents each, by addressing the "Commissioner of Patents, Washington, D. C."